May 10, 1960

E. M. KEATING ET AL 2,935,928

COFFEE POT OR THE LIKE

Filed Feb. 28, 1957

ETHEL M. KEATING.
DANIEL C. MILZER, Jr.
INVENTORS,

BY Roger Sherman Hoar

ATTORNEY.

United States Patent Office 2,935,928
Patented May 10, 1960

2,935,928

COFFEE POT OR THE LIKE

Ethel M. Keating, Shorewood, and Daniel C. Milzer, Jr., Milwaukee, Wis.

Application February 28, 1957, Serial No. 643,170

2 Claims. (Cl. 99—287)

This present application is a continuation-in-part of the copending application of the same two applicants, for "coffee pot or the like," Serial No. 531,918, filed September 1, 1955, now abandoned, which will be voluntarily abandoned without prejudice to this present application.

This invention relates to a coffee pot or the like, more particularly to a cooking utensil for brewing coffee or other similar beverages, or for infusing tea or other similar beverages.

Still more particularly the invention inheres in certain features of such a utensil of the particular sort in which a plunger reciprocating means, such as operated from above the cover of the utensil through a hole in said cover, can be employed to force a filter element downwardly through the liquid to clear it of coffee grounds, tea leaves, or other similar particles.

The principal object of the present invention is to provide simpler and more efficient utensil of the above described sort.

A more particular object is to provide in such a utensil a filter element which does not require disassembling to clean; which is not subject to rot, stain or corrosion, or otherwise requires replacement; and which has single means for performing the two functions of maintaining the vertical position of the reciprocating means and of preventing the by-passing of particles past the periphery of the filter.

A still further particular object is to provide a filter which will filter finely and yet speedily.

These and other objects of the present invention are readily evident from the foregoing general description of the invention, and/or will appear from the description to follow.

In the description, reference is made to the accompanying drawings, which constitute a part of this specification, and in which there is shown by way of illustration, but not of limitation, three specific forms in which the invention may be embodied.

In the drawings.

Throughout the description, the same reference number is applied to the same member or to similar members.

Figure 1:
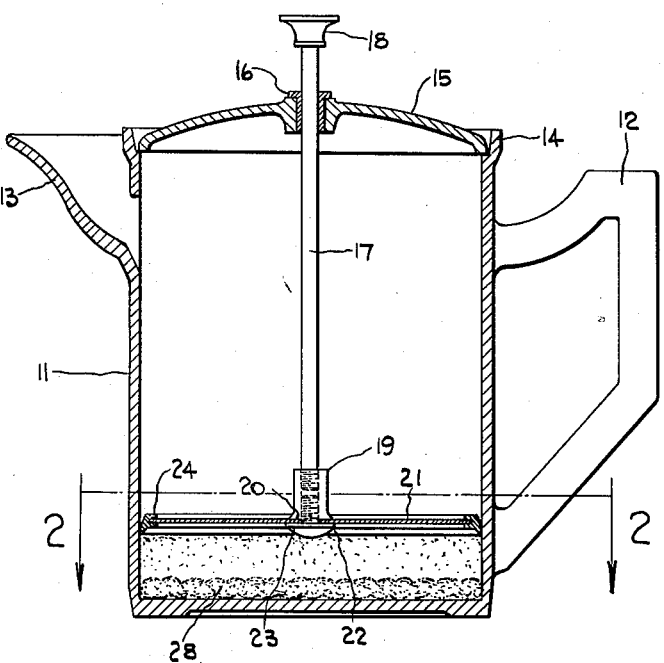
Fig. 1 is a vertical cross-section of the utensil, viewed as though cut along the line 1—1 of Fig. 2.
Figure 3:
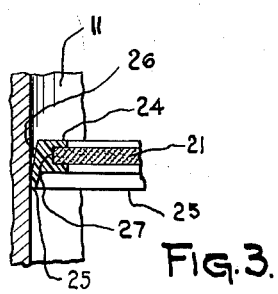
Fig. 3 is an enlarged portion of Fig. 1, showing one edge of the movable filter and an adjoining portion of the side wall of the utensil.
Figure 2:
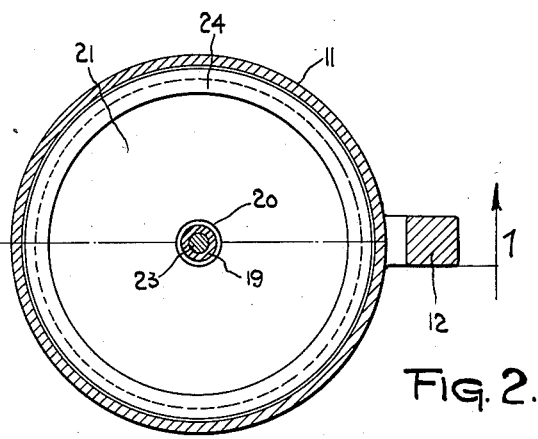
Fig. 2 is a horizontal cross-section of the utensil, viewed as though cut along the line 2—2 of Fig. 1.

Referring now to Figs. 1, 2, and 3, it will be seen that 11 is the main container part of the utensil, which should be of substantially uniform interior horizontal cross-section, preferably cylindrical. Integral therewith is a conventional handle 12, a conventional spout 13, and a flanged top edge 14 for reception of the removable cover 15. The cover could fit the top in any other convenient manner. There is at least one vertical hole, preferably in the center of the cover, in which there is a bushing 16, through which slides vertically a plunger 17, topped by a knob 18, for convenience in manual pushing and pulling. But the claims are not to be considered as limited to any specific sort of reciprocating means, except where so stated.

The bottom end of the plunger is threaded, and screws into a nut 19, which is preferably flanged at the bottom as at 20.

The filter 21 is a thin plate of such peripheral shape as to come within a substantially uniform close distance of the sides of the main container 11 throughout. Thus, if the main container is cylindrical, the filter should be a circular disc.

The filter should be of some rigid inert porous material, capable of withstanding boiling water. This might be: a foraminous or naturally porous ceramic; a foraminous or naturally porous or sintered, rigid plastic; or a foraminous or sintered metal. The preferred material is metal, such as bronze, aluminum, or stainless steel. A still more detailed preference is sintered bronze, plated with some noncorroding metal, such as nickel or chromium, preferably the former. A plastic, such as noncorrodible fluor carbon, preferably sintered, might be employed.

For coffee of the grind best suited for use in the utensil of the present invention (namely drip ground), the pore-opening should preferably be such as to filter-out particles as small as 50 to 125 microns. For such porosity a thickness of from one-sixteenth to one-eighth of an inch is preferable. The choice of pore-opening and thickness will depend upon the size of the solid materials to be filtered out, and the viscosity of the liquid to be let through. When using plated sintered material, it should be remembered that plating reduces the pore-opening, and hence one should start with a larger pore-opening than is desired.

The principal reasons for preferring a rigid self-sustaining material to one requiring support (such as cloth, net, or wire mesh) is that the latter requires disassembly for cleaning, and the filtering element thereof is short-lived.

Among the rigid self-sustaining materials, the choice goes to sintered materials, as against naturally porous materials, or drilled materials, for the following reasons among others. In sintered materials, 50% or more of the holes are interconnected, whereas in other porous materials 90% of the holes do not go anywhere. Due to the circuitous paths of the interconnected holes, the material is stronger per total cross-section of orifice, than in the case of artificially drilled holes. Accordingly, sintered materials will, in a given length of time, filter more liquid per given area and mean pore-opening than either class of competitors.

In the claims, the word "foraminous" is intended to include sintered, naturally porous, or containing drilled holes.

Filter 21 is secured to the bottom of nut 19 by means of a washer 22 and a screw 23.

Figure 4:
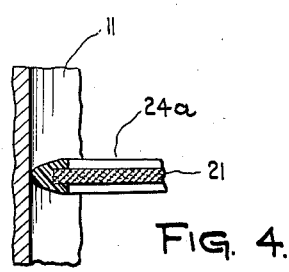
Fig. 4 is a similar enlarged section, showing the same features of a slightly different variant of the invention.
Figure 5:
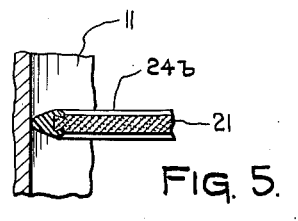
Fig. 5 is a similar enlarged section, showing the same features of a slightly different variant of the invention.
Figure 6:
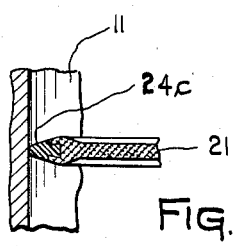
Fig. 6 is a similar enlarged section, showing the same features of a slightly different variant of the invention.
Figure 7:
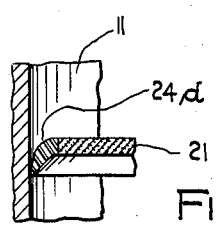
Fig. 7 is a similar enlarged section, showing the same features of a slightly different variant of the invention.

Around the periphery of filter 21, there is snapped a resilient ring, preferably as shown as 24 in Figs. 1 and 3, though it might take any other convenient form, such as shown as 24a in Fig. 4, 24b in Fig. 5, or 24c in Fig. 6. These four forms of ring, and other forms not shown, may be considered as interlocking with the edge of filter 21. The form shown as 24d in Fig. 7 differs from the other four forms shown, in that ring 24d, instead of being snapped onto the edge of filter 21, is bonded thereto with china cement, or any other appropriate permanent adhesive, capable of withstanding boiling water. By virtue of the shape and cooperation of ring 24d with the walls of the main container 11, the pressure of the liquid against the ring, during downward motion of the filter, does not tend to tear the ring off the edge of the filter.

The ring of any of the sorts should be wide enough to make a close sliding fit with the side of main container 11, thus filling the gap between filter 21 and the main container, and thus serving both to maintain the filter in position unless pushed or pulled, and to prevent particles from by-passing the filter. This ring 24 should be made of inert material capable of withstanding boiling water, such as rubber, synthetic rubber, or comparable flexible plastics.

The preferable embodiment 24, of Figs. 1 and 3 is characterized as follows. Resilient ring 24 and filter 21 together constitute a shallow inverted cup, the lip 25 of which practically coincides with the interior surface of container 11. The peripheral face 26 of ring 24 is preferably substantially frusto-conical. Such an arrangement imposes little resistance to raising the filter; but, during lowering, seals the contact between ring 24 and container 11, so as effectively to prevent particles from by-passing the filter. The same is true of ring 24d.

Preferably annular groove 27 in the inner surface of ring 24, which groove receives the periphery of filter 21, is a simple parallel-sided groove, which depends upon the resiliency of the ring, rather than upon a dovetail connection, to hold the ring on the filter.

The invention operates as follows. The cover 15, and with it plunger 17 and the filter-and-ring assembly, are removed. The material to be brewed or infused (such as ground coffee or tea-leaves) is placed in container 11 with boiling water. Alternatively cold or hot water may be used, and the container be placed on a stove for cooking the contents; but this is not recommended.

The cover 15, with plunger 17 pulled up to its maximum height, is then put on, and the brewing, infusion, or cooking takes place. The elevated position of filter 21 permits steam to escape through spout 13. But, if slow steeping be desired, filter 21 may be lowered to below the base of spout 13, to cut-off the escape of steam.

When the process has been completed, the filter 21 should be lowered by slowly but firmly pressing down on knob 18, until the filter compacts all the grounds or other solid material 25, in the bottom of container 11, thus preventing them from contaminating the coffee or tea or the like.

Between batches the filter can be readily rinsed without disassembling; but, for occasional further cleaning, ring 24 can readily be snapped off and on again.

Thus it will be seen that the present invention provides a means for speedily, yet finely, filtering coffee, tea, and the like, which means is durable, and susceptible to being cleaned by merely rinsing under the tap.

Now that five embodiments of the invention have been shown and described, and variations therefrom have been suggested, it is to be understood that the invention is not to be limited to any or all of the specific forms or arrangements of parts herein shown and described.

What is claimed is:

1. A pot for brewing coffee, and like uses, of the type comprising: a liquid container of substantially uniform interior cross-section; a vertically reciprocable filter element of such peripheral shape as to come within a uniformly close distance of the sides of the container throughout, said filter element dividing the interior of the container into a variable upper space and a variable lower space; a removable cover for the container, said cover having at least one vertical hole; and a plunger vertically reciprocable in the hole, and secured at its lower end to the filter element, for thereby reciprocating the filter element; whereby the coffee or the like may be brewed in the lower space, and the liquid portion thereof may be forced through the filter element into the upper space, thereby leaving the solid portion thereof behind in the lower space; said pot being characterized by the fact that the filter element is a thin rigid plate of sintered metal having a pore opening such as to filter out particles as small as 50 to 125 microns, and a thickness of from one-sixteenth to one-eighth of an inch; and by having a ring of solid resilient material capable of withstanding boiling water, said ring being secured to the edge of the filter element, and filling the space between the edge of the filter element and the sides of the container and slidable on the latter in close contact therewith; the filter element and the ring together inherently constituting an open shallow inverted cup, the lip of which practically coincides with the interior surface of the container.

2. A pot according to claim 1, wherein the peripheral surface of the ring is substantially frustoconical.

References Cited in the file of this patent

UNITED STATES PATENTS

| | | |
|---|---|---|
| 274,061 | Voglesong | Mar. 13, 1883 |
| 1,286,340 | Woster | Aug. 2, 1921 |
| 1,797,672 | Paolini | Mar. 24, 1931 |
| 2,157,596 | Davis | Mar. 9, 1939 |
| 2,176,082 | Kise | Oct. 17, 1939 |
| 2,211,486 | Zoia | Aug. 13, 1940 |
| 2,309,446 | Ekkebus | Jan. 26, 1943 |
| 2,678,248 | Peters et al. | May 11, 1954 |

FOREIGN PATENTS

| | | |
|---|---|---|
| 308,993 | Great Britain | Mar. 27, 1930 |
| 395,548 | Great Britain | July 20, 1933 |
| 416,492 | Great Britain | Sept. 13, 1934 |
| 519,595 | Great Britain | Apr. 4, 1940 |
| 671,895 | Great Britain | May 14, 1952 |